United States Patent [19]

MacDonald et al.

[11] 4,092,436

[45] May 30, 1978

[54] METHOD OF STEAM-STRIPPING ROAST AND GROUND COFFEE OR TEA

[75] Inventors: Dennis L. MacDonald, West Lafayette, Ind.; James August Weikel, Forest Park, Ohio

[73] Assignee: The Procter & Gamble Company, Cincinnati, Ohio

[21] Appl. No.: 747,572

[22] Filed: Dec. 6, 1976

[51] Int. Cl.$^2$ ............................ A23F 1/00; A23F 3/00
[52] U.S. Cl. ................................... 426/478; 426/386; 426/432; 426/435; 426/431; 426/506
[58] Field of Search ............... 426/386, 431, 432, 435, 426/478

[56] References Cited

U.S. PATENT DOCUMENTS

| | | | |
|---|---|---|---|
| 2,689,795 | 9/1954 | Olenikov | 426/442 |
| 3,406,074 | 10/1968 | Klein et al. | 426/478 |
| 3,532,507 | 10/1970 | Cascione | 426/386 X |
| 3,615,665 | 10/1971 | White et al. | 426/478 |
| 3,997,685 | 12/1976 | Strobel et al. | 426/386 X |

*Primary Examiner*—Joseph M. Golian
*Attorney, Agent, or Firm*—Leonard Williamson

[57] ABSTRACT

An improved method of stripping flavorful essential volatiles from a substrate, such as coffee or tea, which comprises contacting a uniform admixture of finely ground ice and the substrate in a suitable vessel with a stream of water vapor and thereby melting said ice, uniformly wetting said substrate and stripping said essential volatiles from said substrate; and collecting said volatiles in a cold trap.

16 Claims, No Drawings

METHOD OF STEAM-STRIPPING ROAST AND GROUND COFFEE OR TEA

BACKGROUND OF THE INVENTION

There are various processing problems associated with both separating delicate essential volatiles from edible substrates and extracting soluble solids from such substrates. See U.S. Pat. No. 3,821,447, June 28, 1974 to Jasovsky et al., and U.S. Pat. Pat. No. 3,717,472, Feb. 20, 1973 to Strobel.

For example, take roast and ground coffee. Prewetting a charge of roast and ground coffee with water is known in the art. For prewetting in steam-stripping processes see Clinton et al., U.S. Pat. No. 3,244,531, Apr. 5, 1966, and Cascione, U.S. Pat. No. 3,532,507, Oct. 6, 1970, both assigned to the General Foods Corporation.

Prewetting of roast and ground coffee in extraction processes is also known in the art. For example, see Patel U.S. Pat. No. 3,549,380 and Sivetz and Foote, *Coffee Processing Technology*, Avi Publishing Company, 1963, Vol. 1, page 338, both of which are incorporated herein by reference.

Patel discloses a process of uniformly wetting roast and ground coffee during the loading of the coffee into an extraction column for capacity and processing improvements.

The Sivetz reference teaches that prewetting has the advantages of improving cup flavor, assisting in gas liberation from the disrupted cells of the roast and ground coffee, reducing the channeling of fines during the extraction process, and contributing to lower frequencies of excessive pressure drops.

Additionally, the Sivetz reference says that prewetting can be done outside of the extraction column but further notes that this practice is bad "because it causes staling of ground coffee in less than an hour, accompanied by a heavy undesirable flavor and a loss in natural coffee volatiles." Sivetz teaches that prewetting of roast and ground coffee within the extraction columns subsequent to loading allows more fresh coffee solubles to be released before hydrolysis products and tars are pushed through the system.

Kappenberg et al. in U.S. Pat. No. 2,340,758 discloses prewetting by uniformly distributing prewetting liquid through the coffee mass "as by spraying it with agitation." The Kappenberg et al. reference teaches prewetting outside of the extraction column previous to loading and thereafter the wetted coffee after swelling is transmitted to the extraction chamber where it is packed either by hand or mechanically. This process, according to Kappenberg et al., is described to have the advantage of continuous operation without channeling, clogging, buildup of high back pressures and the like, and also the attendant advantage of high throughput. The patent notes that as a result of the prewetting more finely ground coffee can be used. The patent further notes that it is not feasible to prewet the fresh roast and ground coffee in the extraction chamber because it cannot be evenly wetted and, more seriously, it expands when wetted within the restricted space causing the formation of dense masses and consequent jamming of the columns.

As shown by these several prior art references, there are certain advantages in prewetting after entry into a suitable vessel or extraction column and certain advantages in prewetting before entry into the vessel. However, as shown by the teachings of these references, both prewetting prior to placement in the vessel and prewetting after placement in the vessel also have accompanying disadvantages. If the prewetting is done prior to placement of the roast and ground coffee in an extraction column, the grind size of the roast and ground coffee must be smaller to compensate for the swelling of the coffee particles which naturally occurs upon wetting. The swelling of the coffee particles, as one would expect, increases their volume and thereby decreases the load capacity of the extraction column. Decreasing the load capacity of the extraction column decreases the throughput of the column and thereby lessens extraction efficiency.

Prewetting inside of the reaction vessel, as shown in these several references, has several disadvantages. For example, once the roast and ground coffee is packed inside the reaction vessel or extraction column, as the case may be, prewetting of said coffee in a uniform manner was heretofore believed to be a practical impossibility. As a result, some of the coffee particles are prewetted and swell and others are not contacted with the prewetting liquid and, therefore, do not swell. This non-uniform prewetting causes large pressure drops across the reaction vessel which often results in channeling and clogging of the reaction vessel and necessitates a complete shutdown followed by a time-consuming cleaning process.

Additionally, prewetting inside of the vessel heretofore necessitated the use of lower levels of coffee fines which, in turn, decreased product yield. Coffee fines, as the term is used herein, is defined as roast and ground coffee capable of passing through a 20 mesh U.S. Standard Screen. The reason that less coffee fines can be used if prewetting inside of an extraction column or distillation vessel is practiced is because the prewetting is not uniform and oftentimes the fines are not contacted with the prewetting liquid. Because the fines are not contacted with the prewetting liquid, they do not exhibit the usual swelling phenomena associated with prewetting. Thus, the unwetted fines tent to remain at their non-prewet original sizes and as they agglomerate during steaming or extraction they tend to clog the vessels, causing a buildup of back pressure which, in turn, necessitates a shutdown and cleaning process.

Prewetting the coffee particles prior to, or during, loading of the coffee particles into a reaction vessel has been practiced to avoid some of the above-mentioned problems. However, prewetting outside the column causes staling of roast and ground coffee in less than an hour, accomplished by the development of a heavy, undesirable flavor. Also, if the coffee particles are to be subjected to a steam distillation operation before aqueous extraction, such prewetting prior to, or during, loading is unfeasible. This is because the steam distillation process, by its very nature, tends to desorb the most volatile essentials upon the coffee particles' initial contact with moisture during steam distillation. Thus, prewetting the coffee particles before they are secured inside the vessel results, in effect, of releasing the most volatile, and often the most desirable, essentials from the coffee particles before the steam distillation operation is commenced.

Consequently, it would be desirable to be able to add the coffee particles to the extraction column in a non-moist condition to preserve the more highly volatile flavor and aroma components for steam distillation thereof, but yet avoid the processing problems encountered when dry coffee particles are loaded in a conventional extraction column.

The present invention affords the major advantages of prewetting outside of the reaction vessel, prewetting during loading, and prewetting inside the reaction vessel without the attendant disadvantages of either process. Pressure drops and backup pressure are no longer a problem, the percentages of fines employed can be higher or all fines can be employed.

The present invention includes improvements in this type of process which permits high yields, i.e., substantially complete devolatilization and/or extraction of the essential volatiles and/or extractable constituents of the substrate without channeling, clogging, building up of pressure drop and the like; high output from the given apparatus at low cost, and the production of a product of consistently high concentration and quality.

OBJECTS

Accordingly, it is an object of this invention to provide a novel method of wetting roast and ground coffee which combines the advantages of prewetting outside of the reaction vessel and prewetting inside of the reaction vessel without the attendant disadvantages of either process.

Another object of this invention is to provide a method of prewetting roast and ground coffee which eliminates the problem of excessive pressure drops within the reaction vessel.

It is also an object of the present invention to provide an improved method of uniformly wetting substrates like roast and ground coffee, which eliminates the problem of excessive pressure drops for both steam distillation and aqueous extraction operations.

It is an additional object of the present invention to provide a method for uniformly prewetting substrates like roast and ground coffee inside a distillation or extraction vessel so as to avoid channeling of the particles and the undesirable effects caused therefrom.

Still another object of this invention is to provide a method of prewetting roast and ground coffee which allows a higher percentage of fines to be used in a distillation and extraction process.

Another object of this invention is to provide a method of prewetting roast and ground coffee which prevents the staling of the roast and ground coffee prior to its entry into the reaction vessel.

Another object of this invention is to provide a method of prewetting roast and ground coffee which increases the extraction and distillation capacity.

Other objects and advantages will become apparent from the following description.

All percentages and mesh sizes are, respectively, percentage by weight and U.S. mesh, unless otherwise indicated.

SUMMARY OF THE INVENTION

Briefly, the method of this invention involves reducing the temperature of an edible substrate which is expandable upon wetting, especially roasted ground coffee, or tea to a temperature approximating the freezing point of water and admixing the ground edible substrate with substantially melt-free finely ground ice before or during loading said admixture into a reaction vessel, e.g., an extraction column. Preferably the vessel is evacuated and held at an absolute pressure of below about 200 mm of Hg. Distillation, preferably low-temperature steam distillation, of the edible substrate essential volatiles is then commenced by passing a stream of water vapor through said vessel, which causes the ice particles, which are substantially uniformly dispersed, throughout the edible substrate to melt. This results in uniform wetting of the edible substrate and the melting ice provides the necessary voids which are filled by the expanding particles during moisture absorption. The essential volatiles are condensed in a cold trap.

After steam distillation, the edible substrate, preferably roast and ground coffee, may be subjected to an aqueous extraction to remove the bulk of the solubles. The essential volatiles may then be added back to the extract to produce an improved full-bodied flavor and aroma product.

DETAILED DESCRIPTION OF THE INVENTION

For convenience and clarity as well as succinctness, the following description of the invention is given in the context of utilizing roast and ground coffee as the food substrate; however, as heretofore explained and as will be especially evident from an examination of the disclosure, this process has a wider utility use than for coffee alone, and can be applied to many food substrates which are expandable upon wetting including tea and cocoa.

In the practice of the present invention, a blend of roasted coffee beans, preferably one suitable for both steam stripping and aqueous extraction, is ground, admixed with substantially melt-free finely ground ice and loaded into a suitable reaction vessel, e.g., an extraction column. Many types of conventional reaction vessels can be employed in the practice of the present invention as a variety of distillation vessels and extraction columns are well known in the art. The ice should be substantially melt-free until distillation is commenced.

Typical roasting equipment and methods for roasting coffee beans are described, for example, in Sivetz and Foote, *Coffee Processing Technology*, Avi Publishing Company, Westport, Conn. 1963, Vol I, at pages 203–266. Typical grinding equipment is described, for example, in Sivetz and Foote, supra, pages 239–250.

Also contemplated as included within the present invention is the steam distillation of roast and ground coffee particles in almost any type of column or closed vessel, whether or not such a vessel may be employed in a subsequent extraction operation of the roast and ground coffee particles.

Coffee volatiles can be distilled from the roast and ground coffee/ice admixture by, for example, steam distillation of the roast and ground coffee, while the coffee is in a multicolumn extraction train. A multicolumn extraction train is composed of a number of elongated extraction columns connected in a series for continuous countercurrent operation. Steam distillation of the roast and ground coffee can be accomplished by passing steam through the coffee column containing initially the substantially melt-free ground coffee/ground ice admixture for from about 10 to about 45 minutes.

After the distillation operation is completed, the uniformly prewet roast and ground coffee can be extracted, e.g., by admitting heated water, for example, water having a temperature of from 320° to about 375° F, to the last column (i.e., column containing the most spent or extracted coffee) of the extraction train. The temperature of the water is allowed to decrease by natural heat losses or by intercolumn heat exchangers as it passes through the system. The water extract is withdrawn from the column containing the freshest, that is, previously unextracted, roast and ground coffee at a temperature of from about 190° to about 230° F.

The roast and ground coffee is cooled to a temperature approximating the freezing point of water. It is critical that the ice in the admixture be substantially melt-free until distillation commences; however, a little melting can be tolerated. It is preferred that the ground ice be super-chilled below its melting point before grinding it, as well as before admixing it with the roast and ground coffee particles. Mixing the roast and ground coffee with the ice can be carried out by any means known in the art, including during loading, so long as a relatively uniform mixture is obtained and the critical temperature is maintained.

The amount of ice admixed with the roasted ground coffee is an amount sufficient to maintain substantially the temperature of the coffee and to form a substantially melt-free and uniform admixture.

The weight ratio of roasted ground coffee to ground ice is preferably from about 2:1 to about 10:1, and most preferably, 2.5:1 to about 4:1. The ice is preferably finely ground to a particle size compatible with the coffee grind particle size.

In conventional column extraction of roast and ground coffee for preparing an instant coffee product, any roast and ground coffee particle size more coarse than through a 20-mesh screen is desirable for extraction. As a general rule, no more than about 7% of the grounds employed can pass through a 20-mesh screen without creating the usual pressure and clogging problems that accompany the use of a high percentage of fines. However, by loading an admixture of finely ground ice and the roast and ground particles into the extraction column, as described herein, one can employ as much as 30% fines in combination with conventional extraction grind sizes without encountering any problems due to back pressure during low temperature steam distillation and extraction. Consequently, another advantage of this invention is that if a conventional grind size is employed herein, the percentage of fines in the blend need no longer be as critically controlled by the operator.

If a slurry extraction operation is used instead of the conventional column extraction, an even smaller grind can be used. In fact, steam distillation of essential coffee volatiles can be conducted on a coffee grind of which all of said grind passes through a 20-mesh screen.

If desired, the coffee can be maintained in an inert gas atmosphere during loading, or the vessel purged with an inert gas after loading and prior to steam distillation. However, with the practice of the present invention, such an expedient is not necessary since no significant oxidation, with its consequent flavor or aroma degradation, takes place due to the low temperatures at which the coffee particles are maintained.

In the past, much attention has been focused upon the direction of steam flow, i.e., whether upwardly or downwardly, in a steam distillation process as an important consideration in avoiding the production of acid and acidic-flavored components in the steam distillate. However, there is no criticality in the direction of steam flow in the practice of the present invention. It is, however, preferred that the steam entry port be at the top of the extraction column and the steam exit port be at the bottom.

After the mixture of roast and ground coffee and ice is placed into a suitable steam-stripping vessel, the vessel is placed at a pressure which will allow water vapor to pass through the mixture. Thus, the vessel can be placed at superatomspheric, atmospheric or vacuum conditions, although vacuum conditions which minimize flavor degradation and facilitate removal of steam-stripped volatiles will be preferred.

In a preferred embodiment of the present invention, after the vessel is secured from outside contamination, distillation under vacuum conditions is commenced with low-temperature steam. Preferably, the vessel, loaded with ground coffee/ice admixture, is exposed to a reservoir of water having a temperature of from about 20° to about 50° C. The loaded column and the reservoir are evacuated to a pressure of from about 0.1 mm Hg to about 200 mm Hg absolute, and preferably from about 1.0 mm Hg to about 50 mm Hg absolute. Because of these vacuum conditions existing within the column and the reservoir, the water rapidly boils and evaporates to provide "low temperature steam" or water vapor. Of course, those skilled in the art will understand that temperature and pressure are interrelated and that either can be varied somewhat when accompanied by an off-setting change in the other, although both are preferably low, as previously indicated.

Steam is brought into contact with the roast and ground coffee/finely ground ice mixture in an amount sufficient to melt the ice particles and uniformly wet the roast and ground coffee and to uniformly strip volatile essentials therefrom. The uniform wetting will also cause the particles to expand. This expansion is especially evident in coffee particles of a finer grind size. Moreover, since the expansion of the coffee particles taking place upon wetting in the closed vessel is accompanied by a corresponding creation of voids caused by the melting, there is sufficient room for expansion without creating any large pressure drops or buildup across the vessel. In low temperature steam distillation, heat degradation of desirable essentials or the production of acid or acidic-flavored components typical of conventional steam distillation processes is avoided.

The volatile essentials are removed from the vessel to a suitable condensing means is known manner. Where the vessel is under a positive pressure, the volatiles and steam can be removed by release of pressure. Preferably, volatiles removal will be facilitated by employing vacuum conditions in the vessel and allowing the vacuum conditions to draw the water vapor into and out of the vessel. The steam distillation can be performed by passing only water vapor through a column of the roast and ground coffee and ground ice admixture, as described immediately preceding. Alternately, an inert gas, saturated with water vapor, may be utilized in the steam distillation process for good results. The inert gas can be nitrogen, argon, helium, freon, or others. Preferably, the inert gas is either nitrogen, carbon dioxide, or a combination of the two.

The volatile essentials are collected in a cold temperature trap to form an essential condensate. Preferably, said components are collected at a temperature of from about −100° to about −320° F. This condensate is composed of the volatile essentials frozen together with the water vapors removed during steam distillation. Also, any inert gas utilized in the steam distillation will be present in the trap. The use of carbon dioxide as the inert gas has the advantage of providing a diluent and protecting medium for the highly reactive volatile essentials by separating portions of the essential concentrate from each other as they are collected and solidified in the trap in the form of an essential -$CO_2$ matrix. This is advantageous because it allows for maintaining the essential concentrate in a relatively stable condition which prevents internal chemical reaction between different portions thereof. Once such interaction is commenced it will carry through the entire essential concentrate in an autocatalytic fashion and rapidly develop rancidity. If an inert gas is used for the steam distillation, it is preferred that the gas be saturated, or nearly saturated with water vapor so as to keep the moisture from being removed from the roast and ground coffee particles as the gas is passed through the bed. In other words, during the steam distillation operation, it is preferable to maintain the coffee particles at a substantially constant moisture content. To insure that the most volatile of the essentials are frozen, it is preferred that the low temperature trap be maintained at as low a temperature as is practical and under an atmosphere of about 0-80 mm absolute pressure. Such a trap can be held at liquid nitrogen temperatures which will provide sufficiently low temperatures to rapidly freeze the volatile components before they can be degraded or to form an essential concentrate-$CO_2$ matrix if such inert gas is utilized.

The essential concentrate thus produced can be utilized in a number of different manners known to the art. The frozen essential condensate can be removed from the trap and overlaid with coffee oil and dehydrated or freeze dried. The $CO_2$ content will rapidly sublime while the temperature is slowly rising, leaving a highly flavored and aromatized coffee essential concentrate which can be added back to conventionally prepared dry instant coffees. Also, the solid essential concentrate can be mixed with frozen coffee oil, size-reduced to a fine powder, and exposed to ambient conditions to provide a flavor- and aroma-enriched coffee oil. Alternatively, the frozen essential concentrate can be added directly to a concentrated liquid coffee soluble extract. The enhanced extract is then dried, preferably by either freeze- or vacuum-drying to produce a flavor- and aroma-enriched instant coffee product.

Following removal of the essential volatiles in the steam distillation, preferably low temperature, the bulk of the coffee solubles are then removed by any conventional aqueous extraction. This extraction will most typically be accomplished in the same vessel as those used for steam distillation, as described herein. However, this expedient is solely for operating efficiency and no limitation on the type of apparatus used for extraction is intended herein. In the usual processing setup, about 5 to 16 separate columns are connected in series to form an extraction train. A typical extraction train more often than not will consist of six columns. Each extraction column can be initially filled with roast and ground coffee/ice admixture, steam distilled and extracted. After the content of solubles in the roast and ground coffee has been fully hydrolyzed and extracted, that column is disconnected from the system and the spent or exhausted coffee grounds are withdrawn and discarded. Simultaneously, or more commonly, just before the spent grounds are withdrawn a fresh-filled column is placed on the stream as a new column in the series at the opposite end from that end where the spent grounds in the column are being withdrawn from the system.

Typical disclosures of equipment and methods which can be used in the extraction operation can be found in Sivetz, supra, pages 261-378 and U.S. Pat. No. 2,515,730, July 18, 1950, to Ornfelt.

The aqueous coffee solubles extract emitting from the extraction train is thereafter concentrated by any of a number of methods known to the art, for example, thin film-evaporation, to a concentration of preferably of at least 50% solubles concentration to minimize the possibility of extreme flavor deterioration during subsequent drying. After the aqueous extract has reached a suitable degree of concentration, it is dried to yield a dry coffee solubles powder. This powder is then mixed with the essential concentrate produced by the herein-described steam distillation to form an instant coffee product having the full essentials of freshly brewed, perked coffee.

EXAMPLE 1

A blend of roasted coffee beans and ice were supercooled with dry ice using the following: coffee beans, 1400 grams; ice, 560 grams; and dry ice, 700 grams. The coffee, ice and dry ice were all ground together in a lab grinder (Model 480, American Duplex Co., Louisville, Ky.) which was set on a "Very Fine" grind setting to obtain a substantially melt-free and uniformly ground coffee/ice mixture. Almost all (83.4%) of such a coffee grind passes through a 20-mesh U.S. standard screen.

The substantially melt-free ground coffee/ice admixture was then loaded into a 2-foot (3 in. diameter) stainless steel column having a capacity of about 2.5 lbs. of roast and ground coffee, about 1100 grams of coffee, and, about 439 grams of ice and some dry ice were used to form the bed.

The column was put under an absolute pressure of about 5 mm of mercury. Water vapor was then drawn through the column.

The admixture was consequently contacted with about 450 grams of low temperature steam having a top temperature of 46° C and a bottom temperature of about 25° C. The ice melted and the roast and ground coffee was uniformly wetted and flavorful coffee essential volatiles were stripped and condensed in a cold trap cooled with dry ice and held under an absolute pressure of about 3 mm of mercury. About 84.4 grams of an essential condensate containing essential coffee volatiles was collected in the form of a frost. No clogging or pressure drop problems were encountered.

The prewet steam-stripped roast and ground coffee was flushed out of the column with about 2000 grams of heated water and 3730 grams of aqueous roast and ground coffee slurry was obtained; thus, about 630 grams of water was absorbed by the roast and ground coffee. The slurry was agitated and high-quality soluble coffee solids were recovered by the aqueous slurry extraction operation. This extract was freeze concentrated to a coffee extract having about 20% solids which was added to the frost. This essential-extract concentrate was feeze dried and resulted in an improved flavorful instant coffee.

EXAMPLE 2

The procedure set out in Example 1 is repeated except that liquid nitrogen is used to cool the cold trap instead of dry ice. A larger yield and a more flavorful essentials condensate are obtained which in turn resulted in an even more improved flavorful instant coffee.

What is claimed is:

1. A method of stripping essential volatiles from roast and ground coffee comprising the steps of:

(a) cooling substantially dry roast and ground coffee to a temperature of at least that approximating the freezing point of water;
(b) admixing finely ground ice with said roast and ground coffee in an amount sufficient to maintain substantially said temperature and to form a substantially melt-free and uniform admixture wherein said admixture has a ratio of roast and ground coffee to ground ice on a weight basis of from about 2:1 to about 10:1;
(c) forming a bed of said admixture in a suitable sealed vessel at a pressure effective to allow water vapor to pass through said bed;
(d) passing water vapor through said bed in an amount sufficient to melt said ice and uniformly wet said roast and ground coffee and to uniformly strip said essential volatiles from said roast and ground coffee; and
(e) collecting said essential volatiles in a cold trap.

2. The method of claim 1 wherein said vessel is held under an absolute pressure of from about 0.1 to about 200 mm of mercury.

3. The method of claim 1 wherein said cold trap is held under an absolute pressure of from about 0 to 80 mm of mercury and at a temperature approximating that of liquid nitrogen.

4. The method of claim 1 wherein said water vapor has a temperature of about 20° to 50° C.

5. The method of claim 2 wherein said absolute pressure is in the range of from about 1 to about 50 mm of mercury.

6. The method of claim 1 wherein substantially all of said roasted and ground coffee comprises a grind of which about 30% passes through a U.S. No. 20-mesh screen.

7. The method of claim 1 wherein said water vapor contains an inert gas selected from the group consisting of nitrogen, argon, helium, freon, or carbon dioxide.

8. The method of claim 1 wherein said admixture has a ratio of roast and ground coffee to ground ice on a weight basis of from 2.5:1 to about 4:1.

9. A method of uniformly prewetting roast and ground coffee for an aqueous extraction operation comprising the steps of:
(a) cooling substantially dry roast and ground coffee to a temperature of at least that approximating the freezing point of water;
(b) admixing finely ground ice with said roast and ground coffee in an amount sufficient to maintain substantially said temperature and to form a substantially melt-free and uniform admixture wherein said admixture has a ratio of roast and ground coffee to ground ice on a weight basis of from about 2:1 to about 10:1;
(c) forming a bed of said admixture in a suitable vessel at a pressure effective to allow water vapor to pass through said bed;
(d) contacting said bed with an amount of water vapor effective to melt said ice and uniformly prewet said roast and ground coffee for said aqueous extraction operation.

10. The method of claim 9 wherein said vessel is an extraction column.

11. The method of claim 9 wherein said vessel is held under an absolute pressure of from about 0.1 to about 200 mm of mercury.

12. A method of separating essential volatiles from an edible substrate selected from the group consisting of roast and ground coffee or tea which edible substrate is expandable upon wetting which comprises the steps of:
(a) cooling the edible substrate to a temperature of at least the approximating the freezing point of water;
(b) admixing finely ground ice with said substrate in an amount sufficient to maintain substantially said temperature and to form a substantially melt-free and uniform admixture wherein said admixture has a ratio of said edible substrate to ground ice on a weight basis of about 2:1 to about 10:1;
(c) forming a bed of said admixture in a suitable sealed vessel at a pressure effective to allow water vapor to pass through said bed;
(d) passing water vapor through said bed in an amount sufficient to melt said ice and uniformly wet said substrate and to uniformly strip said volatiles from said substrate; and
(e) collecting said volatiles in a cold trap.

13. The method of claim 12 wherein said vessel is held under an absolute pressure of from about 0.1 to about 200 mm of mercury.

14. The method of claim 13 wherein said edible substrate is subdivided.

15. The method of claim 13 wherein said edible substrate is tea.

16. The method of claim 13 wherein said water vapor has a temperature of about 20° to 50° C.

* * * * *